Figure 1:
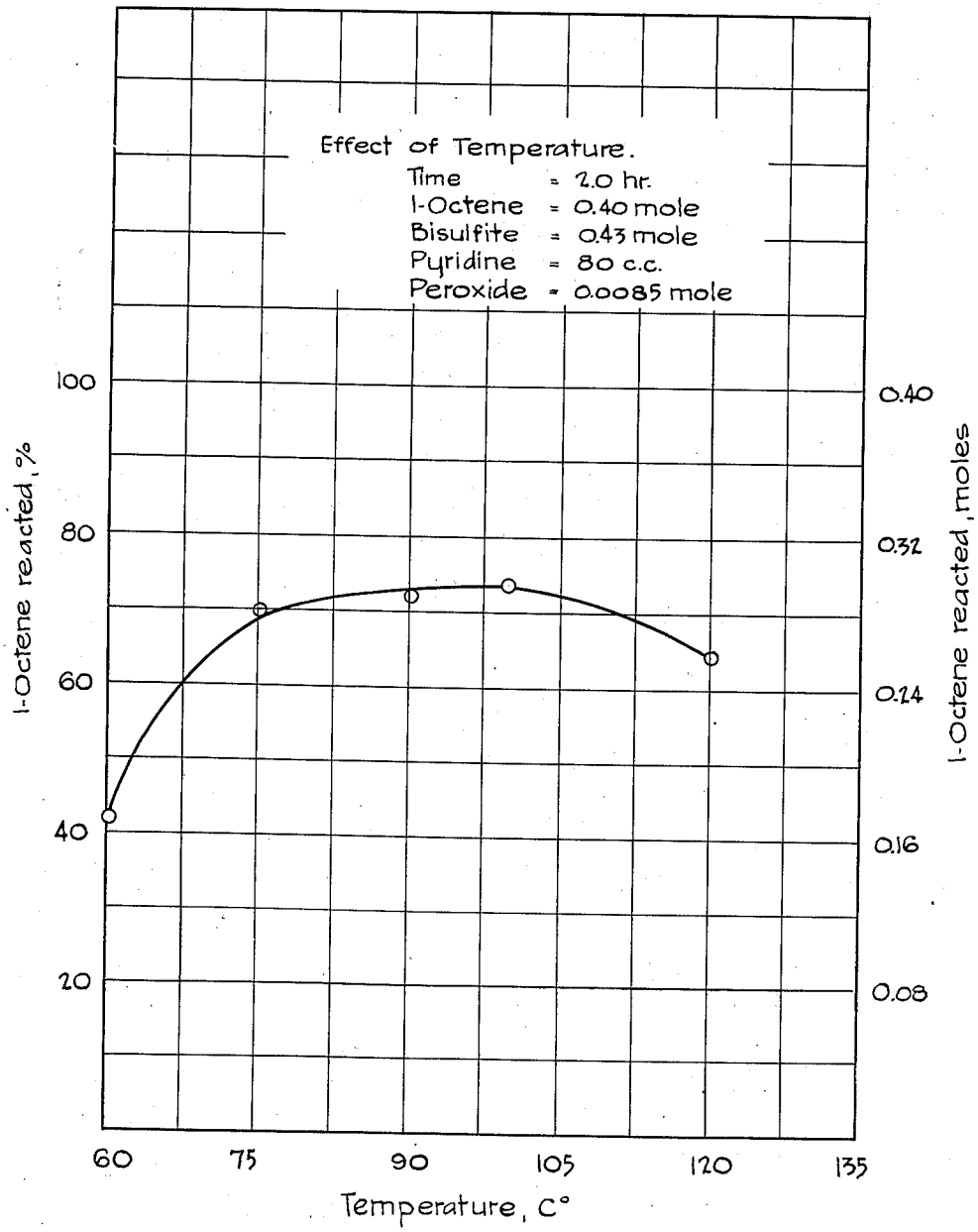

| Patented Apr. 18, 1950 | 2,504,411 |

UNITED STATES PATENT OFFICE 2,504,411

PREPARATION OF ALKYL SULFONATES

Denham Harman, Berkeley, Calif., assignor to Shell Development Company, San Francisco, Calif., a corporation of Delaware Application March 19, 1948, Serial No. 15,858

5 Claims. (Cl. 260—513)

The present invention relates to the production of alkyl sulfonates by the addition of bisulfite ions, ($HSO_3-$), to olefinic double bonds. More particularly the invention provides an improvement in such processes whereby the reaction is initiated by a class of compounds which tend to selectively promote the desired reaction in the absence of the undesirable side reactions heretofore thought to be unavoidable in the addition of bisulfite ions to olefins.

The reaction between bisulfite ions in aqueous solutions and water soluble compounds containing olefinic double bonds has been known for many years. It was soon learned that the reaction could be extended to water insoluble unsaturated compounds (with diminished yields) by the employment of a polar organic solvent. Initially the reaction was catalyzed by gaseous oxygen, but later investigators found that the reaction could be initiated by a variety of oxidizing agents. Kharasch, May and Mayo, Jr. Org. Chem. 3 175–192 (1938) reported that oxidizing agents such as nitrate or nitrite ions could be substituted for oxygen as the reaction initiator. U. S. Patent 2,318,036 disclosed that still other oxidizing agents particularly those acting through the release of nascent oxygen including certain peroxides could be employed. While it was known that the reaction involved a free radical mechanism it was thought that compounds capable of oxidizing bisulfide were necessary to bring about the reaction. However, in addition to oxidizing the bisulfite ions in the sense that an electron or a hydrogen atom is removed to convert the ions to a free radical thus oxidizing it from a charge of minus one to zero, such reagents also to a large extent convert the bisulfite ions to sulfate ions. The conversion of bisulfite to sulfate is, of course, a loss of reactant and it heretofore required the employment of large excesses of bisulfite as well as initiator to obtain appreciable yields of alkyl sulfonates.

It is a principal object of the present invention to provide an improved method of forming organic sulfonates by the reaction of olefinic compounds with bisulfite ions in which method high yields are obtained in relatively short reaction times at moderate reaction temperatures without the necessary employment of large excesses of bisulfite or initiator. A further object is the provision of a method of initiating the addition of bisulfite ions to olefinic double bonds by the action of compounds which are relatively inert in respect to oxidizing bisulfite ions to sulfate ions under the reaction conditions suitable for the addition of the bisulfide ions to an olefin. Another object is to provide a series of reaction initiators and organic mutual solvents which when employed together as reaction initiator-mutual solvent pairs in a reaction between an olefin and a solution containing bisulfite ions make possible the production of substantially quantitative yields of alkanesulfonates. Still other objects and advantages will be apparent from the following discussion.

We have now discovered that the employment of certain organic peroxides, having the structure defined below, in the reaction process comprising the addition of bisulfite ions to olefinic compounds produces the following unobvious results. The defined class of peroxides initiate the addition reaction without oxidizing the bisulfite ions to sulfate ions, therefore the employment of equivalent amounts of bisulfite ions and minute amounts of the peroxides produce high yields in short times at moderate temperatures. The defined class of peroxides when employed in conjunction with certain organic mutual solvents in the form of reaction initiator-mutual solvent pairs, such as are illustrated below, provide a means of attaining substantially 100% yields of the desired sulfonates under similar conditions of reaction time and temperature.

The reaction initiators suitable for the present process are organic peroxides in which the valences of the peroxy group —O—O— are satisfied by organic radicals at least one of which is connected to the peroxy group by a carbon atom bonded to three carbon atoms. Examples of individual peroxides suitable for the process include di-tertiary-butyl peroxide, 2,2-bis(tertiary-butylperoxy)butane, tertiary-butyl perbenzoate, tertiary-butyl tertiary-amyl peroxide, di-tertiary-amyl peroxide, 2,2-bis(tertiary-amylperoxy)butane, 2,2 - bis(tertiary - butylperoxy) propane, 2-tertiary-butylperoxy-2-methylhexane, tertiary-amyl perbenzoate, tertiary-butyl perlaurate, tertiary-butyl peracetate.

The tertiary-alkyl peresters in general and tertiary-alkyl perbenzoates in particular form a preferred class of reaction initiators providing extremely high yields of alkyl sulfonates when employed in conjunction with a variety of particular organic solvents. Examples of the tertiary-alkyl peresters include, tertiary-butyl perbenzoate, tertiary-amyl perbenzoate, 2-benzoylperoxy-1,1-dimethylhexane, tertiary-amyl perlaurate, tertiary-butyl perlaurate.

The 2,2-bis(tertiary-alkylperoxy)alkanes form another preferred class of reaction initiators for the present process providing substantially quantitative yields of alkyl sulfonates when employed in conjunction with methanol and particularly high yields when employed in conjunction with a variety of particular solvents. Examples of the 2,2-bis(tertiary-alkylperoxy)-alkanes include, 2,2-bis(tertiary-butylperoxy)butane, 2,2-bis(tertiary-butylperoxy)propane, 2,2-bis(tertiary-amylperoxy)butane, 2,2-bis(tertiary-butylperoxy)pentane, and 2,2-bis(1,1-dimethylpentylperoxy)butane.

The organic solvents which when employed as mutual solvents with the reaction initiators of the defined structure result in surprisingly improved yields of alkane sulfonates comprise polar organic solvents of the group consisting of primary alcohols of less than 4 carbon atoms, cyclic diethers, and organic amines. Examples of suitable organic mutual solvents include, methyl alcohol, ethyl alcohol, dioxane, diethylamine, hexanolamine, pyridine, propyl alcohol, isopropyl alcohol, ortho, meta or para-toluidine, N-methylaniline, pentanolamine, aniline, N,N-dimethylaniline, butylamine, methyldioxane, symmetrical-dimethyldioxane, N-methyl-N-ethylaniline, propylamine, pentylamine, methylethylamine, dipropylamine, 2, 3 or 4-methylpyridine, pentanolamine, heptanolamine, N-methyl-para-toluidine, N-ethylaniline.

An interesting relation between the peroxide and the polar organic mutual solvent has been observed to make possible substantially quantitative conversion of the olefin to alkanesulfonate when certain of the peroxides are employed in conjunction with certain of the solvents. The following table illustrating reactions conducted under essentially the same conditions is presented to show this relationship. The reactions were conducted by heating a mixture composed of 1-octene (0.4 mole), ammonium bisulfite (0.43 mole as a 5M solution), peroxide 1.6 mls. and polar organic mutual solvent 80 mls. The yield of ammonium octanesulfonate obtained from each peroxide and polar organic mutual solvent combination is presented as to per cent by weight of 1-octene converted to ammonium octanesulfonate.

standardized conditions chosen to illustrate by comparison the importance of the various solvent-peroxide relationships, examples illustrating the preferred modes of conducting the present process are presented below.

The present improved process is in general applicable to the same classes of unsaturated compounds that have been found in the past to be suitable reactants for the addition of bisulfite ions. In the past, the addition reaction, even where a 1-olefin was employed, generally produced yields of 12% or less unless very long reaction periods and large excesses of bisulfite (along with a corresponding excess of reaction initiator) were employed when the olefin contained more than about 6 carbon atoms. The present invention adapts the addition reaction to economical conversions of unsaturated compounds of up to 19 or more carbon atoms. Examples of unsaturated compounds which may suitably be converted to organic sulfonates by the present process include alkenes such as the butenes, the hexenes, the octenes, the octadienes, the decenes, the dodecenes, the tetradecenes, and the hexadecenes, cycloalkenes such as cyclohexene, the ethylcyclohexenes, the cyclohexadienes, the pentyl cyclopentenes, the dibutylcyclohexenes, the ethyldibutylcyclohexenes, and the decyclohexenes, the alkenylaryl hydrocarbons such as styrene, the polybutenylbenzenes, the butenylbenzenes, the hexenylbenzenes and the decenylbenzenes. In general, suitable starting compounds for the present improved process comprise unsaturated compounds of not more than about 20 carbon atoms which contain at least one olefinic double bond. Where the production of substantially pure organic sulfonates is desired mono-olefinic hydrocarbons are preferred, particularly the alkenes, and particularly the 1-olefins containing 4 to 20 carbon atoms.

Any of the sources of bisulfite ions suitable for the basic reaction process as heretofore accomplished may be employed in the present process. In general any compound forming bisulfite ions in an ionic media not in itself reactive with olefinic double bonds may be used as the source of the bisulfite ions. The acid salts of sulfurous

| Solvent | Di-tert-butyl peroxide $t=16$ hrs. $T=120°$ C. | 2,2-Bis(t-butyl peroxy) butane $t=2.0$ hrs. $T=120°$ C. | t-butyl perbenzoate $t=2.0$ hrs. $T=100°$ C. | benzoyl [2] peroxide $t=0.75$ hrs. $T=90°$ C. |
|---|---|---|---|---|
| Methanol | 3.3 | 96.8 | 89 | 0 |
| Ethanol | ([1]) | 26.2 | 84 | ([1]) |
| Pyridine | .59 | 69 | 74 | 0 |
| Hexanolamine | 0 | 0 | 88 | ([1]) |
| Diethylamine | 0 | 0 | 5 | ([1]) |
| Dioxane | 0 | 23 | 0 | ([1]) |
| Acetone | 0 | ([1]) | ([1]) | ([1]) |
| Blank (water only) | 0 | 0 | 0 | 0 |

[1] This combination was not employed.
[2] A peroxide of the class heretofore employed.

The following particularly preferred reaction initiator-mutual solvent pairs have been found to provide surprisingly high yields of sulfonates.

1. 2,2 - bis(tertiary - butylperoxy)butane with methanol.
2. tertiary-butyl perbenzoate with methanol.
3. tertiary-butyl perbenzoate with hexanolamine.
4. tertiary-butyl perbenzoate with ethanol.
5. tertiary-butyl perbenzoate with pyridine.
6. 2,2-bis(tertiary-butylperoxy)butane with pyridine.
7. di-tertiary-butyl peroxide with pyridine.

As the above reactions were conducted under acid, the free acid in solution, or gaseous sulfur dioxide are examples of sources of bisulfite ions suitable for the present process.

In the preparation of detergents, perhaps the most important commercial application of the organic sulfonates, the employment of aqueous solutions of the sodium or ammonium bisulfite is particularly advantageous. Ammonium bisulfite is particularly advantageous because of its reactivity, its employment enables the substantially quantitative conversion of alkenes to ammonium alkanesulfonates. Sodium bisulfite, while in general less reactive and more difficult to remove from the reaction products is advantageous in that the sodium alkanesulfonates are generally more effective as detergents.

In the present process, in contrast to the reaction process as heretofore conducted, since the reaction initiator in initiating the addition reaction forms neither strongly acidic or basic compounds the control of the pH of the reaction mixture is not critical.

The effect of variations in the concentration of bisulfite in the aqueous phase of the improved process is illustrated by the following. Three addition reactions were conducted employing the same reaction initiator, the same alkene, the same polar organic mutual solvent in the same concentrations, and the same volumes of aqueous ammonium bisulfite in which the concentration of the bisulfite was varied. Each of the reaction mixtures were heated to a temperature of 120° C. for 16 hours with constant agitation. The conversion of the ammonium bisulfite to ammonium alkanesulfonate was measured by the olefin consumption.

| Initial concentration of ammonium bisulfite, moles/liter | Per cent of ammonium bisulfite reacted |
| --- | --- |
| 3.0 | 100 |
| 4.5 | 70 |
| 6.0 | 65 |

It is therefore apparent that but little advantage can result from the employment of aqueous solutions containing bisulfite ions in concentration greatly in excess of about 6 equivalent weights per liter. The preferred concentration of ammonium bisulfite in the present process is about 5 moles per liter and it is preferable to employ substantially equimolar portions of bisulfite to olefin. However, wherever it is desirable, either the bisulfite or the olefin may be employed in excess of the other.

A relatively wide range of temperatures may be used in the improved process. In general, temperatures from 50° C. to 200° C. are suitable. In the present process, in addition to its effect upon the olefin and the bisulfite reactants which is one of activating the molecules or ions thus increasing the rate of the desired reaction as well as any possible side reactions, temperature materially influences the rate of decomposition of the reaction initiator. Where the temperature is increased substantially above the temperature at which the reaction initiator begins to dissociate into free radicals, the rate of its dissociation may become greater than the rate at which the radicals attack the bisulfite ions and excessive amounts of the reaction initiator will be consumed for the rate of reaction obtained. The effect of variations of temperature upon a reaction mixture consisting of 0.4 mole of 1-octene, 0.43 mole of ammonium bisulfite in a 5 molar aqueous solution, 80 mls. of pyridine and 1.6 mls. or 0.0086 mole of tertiary-butyl perbenzoate is illustrated by Figure I. The particularly preferred temperature range to be employed where the reaction initiator is tertiary-butyl perbenzoate is from 60° C. to 120° C.

Figure 2:
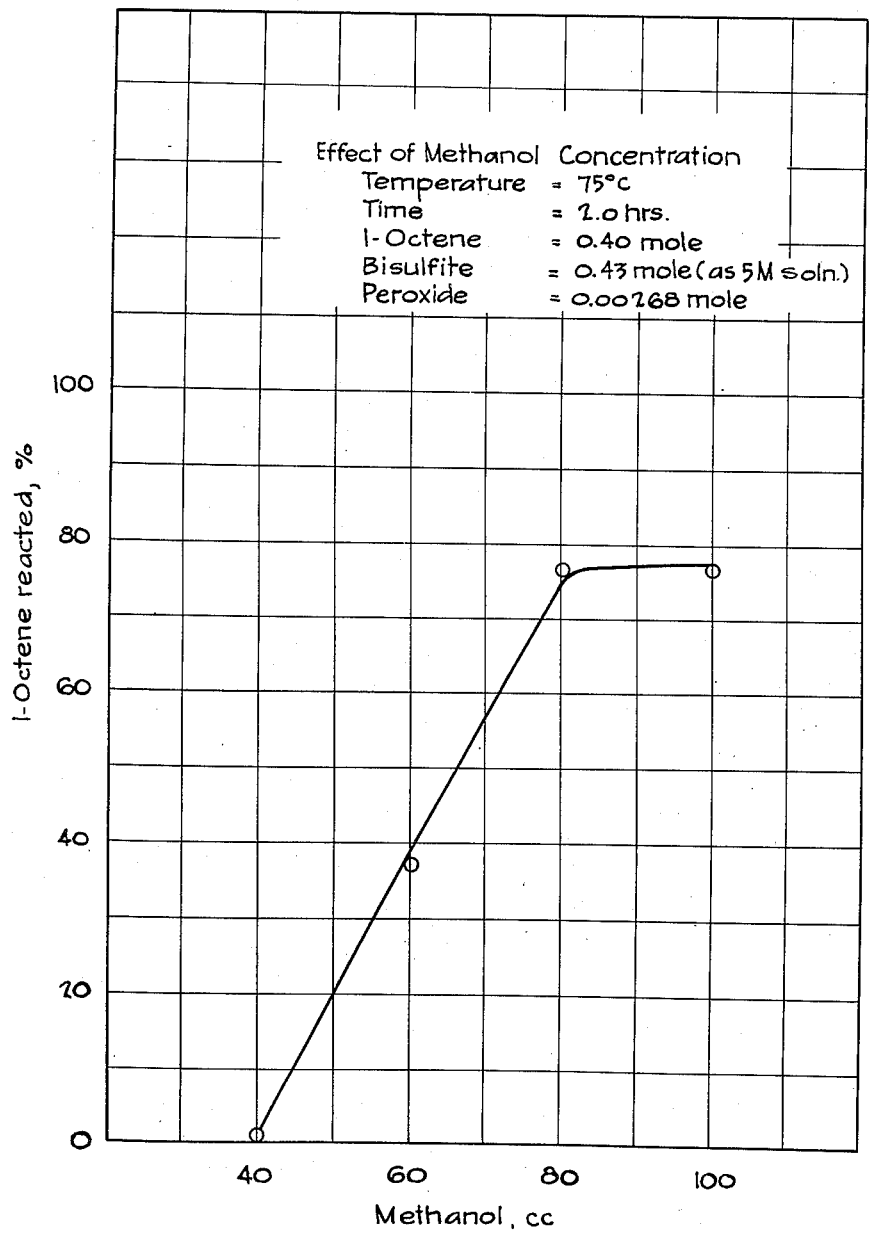

As mentioned previously, the characteristics of the particular organic mutual solvent employed with the various reaction initiators causes considerable variation in the yield of sulfonate obtained. The effects of variations in the amount of the organic solvent in the amounts of ammonium octanesulfonate produced by agitating a reaction mixture composed of 0.4 moles of 1-octene, 0.43 mole of ammonium bisulfite as a 5M solution and 1.6 mls. of tertiary-butyl perbenzoate for two hours at 75° C. in the presence of various amounts of methanol are illustrated by Figure 2. In general, the organic mutual solvent may suitably be employed in volume ratios with the olefin of from 1 volume olefin to from 0.75 to 1.50 volumes of solvent, but is preferably employed in ratios of olefin to solvent of 1 to from 0.9 to 1.2.

The amount of reaction initiator required in the improved process is very small, in general from 0.001 to 0.1 mole of the liquid peroxide per mole of the olefin are sufficient and while more may suitably be employed such employment results in but little increase in yield of sulfonate. The preferred concentration of reaction initiator is a mole ratio of from 0.005 to 0.05 mole of initiator per mole of olefinic compound. The effect of varying the amount of reaction initiator is illustrated by the following examples. Reaction mixtures comprising 0.4 mole 1-octene, 0.43 mole of ammonium bisulfite as a 5M aqueous solution, 80 moles of methanol, and the following amounts of tertiary-butyl perbenzoate were agitated for 2 hours at 75° C. and the per cent conversion of 1-octene to ammonium octyl sulfonate determined.

| Amount peroxide employed | Per cent Conversion | Moles of sulfonate formed / Moles of peroxide employed |
| --- | --- | --- |
| 0.125 mls. or (0.669×10⁻³ mole) | 23 | 137.5 |
| 0.25 mls. or (1.338×10⁻³ mole) | 65.6 | 199 |
| 0.50 mls. or (2.68×10⁻³ mole) | 87 | 130 |

As mentioned above, the bisulfite addition reaction had heretofore been conducted over relatively long periods of reaction to obtain suitable yields. An important feature of the improved process is the fact that high yields of alkyl sulfonates may be obtained within reaction periods of 3 or less hours as compared to 10 or more required by the process as heretofore conducted. Where the length of the reaction period is critical, even higher yields per unit of time may be obtained by employing an excess of the reaction initiator.

The process may be conducted in a batchwise or continuous manner. Reaction pressures at or below normal atmospheric pressure may be employed. However, the improved process is preferably conducted by maintaining the reactants in the liquid phase at an elevated temperature and it is therefore generally more convenient to employ pressures above normal atmosphere.

The following detailed examples illustrate the valuable results obtained by the present improved process as applied to specific unsaturated compounds as well as a comparison between the reaction initiators of the invention with those heretofore employed. As many variations of reactants and reaction conditions are within the scope of the invention, the examples are illustrative only and the invention is not limited to the particular materials or reaction conditions recited therein.

*Example I—The addition of bisulfite ions to olefins in the presence of an oxidizing agent*

For the purposes of comparison, the following bisulfite addition reactions, a–d, are included to illustrate such reactions as heretofore conducted in the presence of gaseous oxygen in the form of air as the reaction initiator. In each case 1-octene and aqueous bisulfite ions in the form of an ammonium bisulfite solution containing 0.374 mole of bisulfite per 100 mls. were employed as the reactants in a molar ratio of olefin to bisulfite of 1:0.86. The reactants were combined in the listed amounts by weight in a stainless steel reactor having a volume of 300 mls. In each case the reaction mixtures were agitated for 22 hours at a temperature of 120° C. The mixed reaction products were separated into aqueous and organic liquid phases and an aliquot portion of the aqueous phase evaporated to dryness and taken up in isopropyl alcohol. Hydrogen chloride gas was bubbled into the alcohol solution and the precipitate ammonium chloride filtered off. The alcohol and hydrogen chloride were then removed by vacuum distillation under pressures gradually reduced to 1 mm. at a temperature of 100° C. From the weight of the alkanesulfonic acid obtained the yield of sulfonates based on the amount of 1-octene employed was calculated.

| | Reactants | | | | Weight of Unreacted 1-Octene | Bisulfite Reacted, Percent | Yield of Sulfonate, Percent Based on 1-Octene |
|---|---|---|---|---|---|---|---|
| | 1-Octene | NH$_4$HSO$_3$ Soln. | Pyridine | Air | | | |
| | g. | g. | Cc. | P. s. i. | | | |
| a | 48.8 | 100 | | (¹) | 46.0 | | 5.7 |
| b | 48.8 | 100 | | 100 | 46.0 | | 5.7 |
| c | 48.8 | 100 | 100 | (¹) | 48.8 | | 0 |
| d | 24.4 | 50 | 50 | 200 | 24.4 | 47 | 0 |

¹ Only the air in the bomb at atmospheric pressure.

*Examples II to IX—The improved process of preparing alkanesulfonates*

II. Heating 67.2 mls. of 1-octene and 87.2 mls. of a 5M solution of ammonium bisulfite to 120° C. for 2 hours in a closed vessel in the presence of 1.6 mls. of 2,2-bis(tertiary-butylperoxy)butane and 80 mls. of methanol produced a 96.8% yield of ammonium octanesulfonate.

III. Heating 67.2 mls. of 1-octene and 87.2 mls. of a 5M solution of ammonium bisulfite to 120° C. for 2 hours in a closed vessel in the presence of 1.6 mls. of tertiary-butyl perbenzoate and 80 mls. of methanol produced a 89% yield of ammonium octanesulfonate.

IV. Heating 67.2 mls. of 1-octene and 87.2 mls. of a 5M solution of ammonium bisulfite to 120° C. for 2 hours in a closed vessel in the presence of 1.6 mls. of tertiary-butyl perbenzoate and 80 mls. of hexanolamine produced a 78% yield of ammonium octanesulfonate.

V. Heating 0.2 mole of 1-decene with 0.2 mole of aqueous bisulfite in the form of a 5M ammonium bisulfite solution in the presence of 80 mls. of methanol and 0.00268 mole of tertiary-butyl perbenzoate for 2 hours at a temperature of 75° C. produced a 77% yield of ammonium decanesulfonate.

VI. Heating 0.2 mole of 1-dodecene with 0.2 mole of aqueous bisulfite in the form of a 5M ammonium bisulfite solution in the presence of 80 mls. of methanol and 0.00268 mole of tertiary-butyl perbenzoate for 2 hours at a temperature of 75° C. produced a 73% yield of ammonium dodecanesulfonate.

VII. Heating 0.2 mole of 1-tetradecene with 0.2 mole of aqueous bisulfite in the form of a 5M ammonium bisulfite solution in the presence of 80 mls. of methanol and 0.00268 mole of tertiary-butyl perbenzoate for 2 hours at a temperature of 75° C. produced a 60% yield of ammonium tetradecanesulfonate.

VIII. Heating 0.2 mole of 1-hexadecene with 0.2 mole of aqueous bisulfite in the form of a 5M ammonium bisulfite solution in the presence of 80 mls. of methanol and 0.00268 mole of tertiary-butyl perbenzoate for 2 hours at a temperature of 75° C. produced a 22% yield of ammonium hexadecanesulfonate.

IX. The sodium salt of octanesulfonic acid was prepared by the procedure of Example II replacing ammonium bisulfite by sodium bisulfite.

I claim as my invention:

1. In a process for the production of an alkanesulfonate by the direct addition of a bisulfite ion to an olefin the improvement which comprises heating to a temperature of from 60° C. to 120° C. a mixture of a 1-olefin of from 2 to 20 carbon atoms, a substantially equimolar proportion of bisulfite ions in the form of an aqueous solution, an amount of methanol forming a volume ratio of olefin to alcohol of 1 to between 0.75 and 1.50, and an amount of 2,2-bis(tertiary-butylperoxy)butane forming a molar ratio of olefin to peroxide of between 1 to 0.001 and 1 to 0.10.

2. In a process for the production of an alkanesulfonate by the direct addition of a bisulfite ion to an olefin the improvement which comprises heating to a temperature of from 60° C. to 120° C. a mixture of a 1-olefin of from 2 to 20 carbon atoms, a substantially equimolar proportion of bisulfite ions in the form of an aqueous solution, an amount of methanol forming a volume ratio of olefin to alcohol of 1 to between 0.75 and 1.50, and an amount of tertiary-butyl perbenzoate forming a molar ratio of olefin to peroxide of between 1 to 0.001 and 1 to 0.10.

3. In a process for the production of an alkanesulfonate by the direct addition of a bisulfite ion to an olefin the improvement which comprises heating to a temperature of from 60° C. to 120° C. a mixture of a 1-olefin of from 2 to 20 carbon atoms, a substantially equimolar proportion of bisulfite ions in the form of an aqueous solution, an amount of pyridine forming a volume ratio of olefin to pyridene of 1 to between 0.75 and 1.50, and an amount of di-tertiary-butyl peroxide forming a molar ratio of olefin to peroxide of between 1 to 0.001 and 1 to 0.10.

4. In a process for the production of an alkanesulfonate by the reaction of an olefin with a substantially equimolar proportion of bisulfite ions in aqueous solution, the improvement which comprises conducting the reaction at temperatures between 60° C. and 120° C. in the presence of a reaction initiator-mutual solvent pair of the group consisting of, 2,2-bis(tertiary-butylperoxy)butane with methanol
tertiary-butyl perbenzoate with methanol
tertiary-butyl perbenzoate with hexanolamine
tertiary-butyl perbenzoate with ethanol
tertiary-butyl perbenzoate with pyridine
2,2-bis(tertiary-butylperoxy)butane with pyridine
di-tertiary-butyl peroxide with pyridine in amounts forming a molar ratio of olefin to peroxide reaction initiator of between 1 to 0.001 and 1 to 0.10, and a volume ratio of olefin to mutual solvent of 1 to between 0.75 and 1.50.

5. In a process for the production of an organic sulfonate by the addition of a bisulfite ion to an organic compound containing one or more olefinic bonds conducted at an elevated temperature and in the presence of a reaction initiator and a mutual solvent, the improvement which comprises employing a reaction initiator-mutual solvent pair of the group consisting of, 2,2-bis(tertiary-butylperoxy)butane with methanol
tertiary-butyl perbenzoate with methanol
tertiary-butyl perbenzoate with hexanolamine
tertiary-butyl perbenzoate with ethanol
tertiary-butyl perbenzoate with pyridine
2,2-bis(tertiary-butylperoxy)butane with pyridine
di-tertiary-butyl peroxide with pyridine.

DENHAM HARMAN.

REFERENCES CITED

The following references are of record in the file of this patent:

UNITED STATES PATENTS

| Number | Name | Date |
|---|---|---|
| 2,268,443 | Crowder | Dec. 30, 1941 |
| 2,318,036 | Werntz | May 4, 1943 |
| 2,398,426 | Hanford | Apr. 16, 1946 |

OTHER REFERENCES

Kharasch et al., J. Org. Chem., Vol. 3, pages 175–192, 1938.

Mayo, Chemical Reviews, Vol. 27, pages 394–399, 1940.